US010657971B1

(12) United States Patent
Newstadt et al.

(10) Patent No.: US 10,657,971 B1
(45) Date of Patent: May 19, 2020

(54) SYSTEMS AND METHODS FOR DETECTING SUSPICIOUS VOICE CALLS

(71) Applicant: Symantec Corporation, Mountain View, CA (US)

(72) Inventors: Keith Newstadt, Newton, MA (US); Ilya Sokolov, Boston, MA (US)

(73) Assignee: NortonLifeLock Inc., Tempe, AZ (US)

( * ) Notice: Subject to any disclaimer, the term of this patent is extended or adjusted under 35 U.S.C. 154(b) by 54 days.

(21) Appl. No.: 15/842,917

(22) Filed: Dec. 15, 2017

(51) Int. Cl.
*G10L 17/26* (2013.01)
*H04M 3/22* (2006.01)
*G10L 15/18* (2013.01)
*G10L 17/00* (2013.01)
*G10L 15/26* (2006.01)
*G06N 20/00* (2019.01)

(52) U.S. Cl.
CPC ............. *G10L 17/26* (2013.01); *G06N 20/00* (2019.01); *G10L 15/1807* (2013.01); *G10L 15/265* (2013.01); *G10L 17/005* (2013.01); *H04M 3/2281* (2013.01)

(58) Field of Classification Search
CPC ....... G10L 17/00; G10L 17/005; G10L 17/26; G10L 15/18; G10L 15/26; G10L 15/265; H04M 3/2281
See application file for complete search history.

(56) References Cited

U.S. PATENT DOCUMENTS

| 9,203,860 | B1* | 12/2015 | Casillas | H04L 63/1433 |
| 9,596,349 | B1* | 3/2017 | Hernandez | H04M 3/5175 |
| 9,672,825 | B2* | 6/2017 | Arslan | G10L 25/63 |
| 10,110,738 | B1* | 10/2018 | Sawant | H04M 3/436 |
| 2011/0026689 | A1 | 2/2011 | Metz et al. | |
| 2012/0254243 | A1* | 10/2012 | Zeppenfeld | H04M 15/47 707/778 |

(Continued)

OTHER PUBLICATIONS

Minh Le et al.; Systems and Methods for Detecting Malicious Phone Calls in Real-Time; U.S. Appl. No. 15/392,930; filed Dec. 28, 2016.

(Continued)

*Primary Examiner* — Paras D Shah
(74) *Attorney, Agent, or Firm* — FisherBroyles, LLP

(57) ABSTRACT

The disclosed computer-implemented method for detecting suspicious voice calls may include (i) identifying an incoming voice call, (ii) extracting, from audio of the incoming voice call, a plurality of characteristics, (iii) calculating a trustworthiness score of the plurality of the characteristics based on a response by a recipient of the incoming voice call, and (iv) storing the trustworthiness score of the plurality of characteristics in a reputation database that (a) receives a request for the trustworthiness score, the request originating from an additional computing device and including an additional plurality of characteristics extracted from an additional incoming voice call, (b) determines that the additional plurality of characteristics matches the plurality of characteristics, and (c) enables the additional computing device to perform a security action on the additional incoming voice call by sending the trustworthiness to the additional computing device. Various other methods, systems, and computer-readable media are also disclosed.

20 Claims, 9 Drawing Sheets

(56) References Cited

U.S. PATENT DOCUMENTS

| | | | |
|---|---|---|---|
| 2013/0183946 A1* | 7/2013 | Jeong | H04W 4/16 455/414.1 |
| 2014/0045456 A1* | 2/2014 | Ballai | H04W 12/12 455/410 |
| 2014/0114790 A1 | 4/2014 | Ayodele | |
| 2016/0044054 A1 | 2/2016 | Stiansen et al. | |
| 2016/0150414 A1* | 5/2016 | Flaks | H04W 12/12 455/406 |
| 2016/0344770 A1 | 11/2016 | Verma et al. | |
| 2017/0060839 A1* | 3/2017 | Kawamura | G10L 25/63 |
| 2017/0142252 A1* | 5/2017 | Bhupati | H04M 3/2281 |
| 2017/0251006 A1* | 8/2017 | LaRosa | H04L 63/1425 |
| 2018/0020092 A1* | 1/2018 | Bender | H04M 3/436 |
| 2018/0241647 A1* | 8/2018 | Baracaldo Angel | H04L 43/08 |
| 2018/0254046 A1* | 9/2018 | Khoury | G10L 17/02 |
| 2018/0295238 A1* | 10/2018 | Hardy | H04L 63/1408 |

OTHER PUBLICATIONS

Sawant et al.; Systems and Methods for Detecting Illegitimate Voice Calls; U.S. Appl. No. 15/242,308; filed Aug. 19, 2016.

\* cited by examiner

SYSTEMS AND METHODS FOR DETECTING SUSPICIOUS VOICE CALLS

BACKGROUND

While significant effort has been put into protecting users from harmful emails, some of the most devastating attacks continue to be launched via voice-to-voice communications. Elaborate fraud rings have been built around cold calling people and making claims of back taxes owed or lottery winnings. These attacks have cheated people out of hundreds of millions of dollars. Many of these attacks are not targeted attempts with a single victim, but instead, masses of similar or identical scam calls sent to arbitrary recipients. While many recipients see through the scam and immediately rebuff the caller or hang up, some recipients may be unaware of the scam and may not take the initiative to do the relevant research before sending large sums of money to the caller.

Unfortunately, most traditional systems for preventing malicious communication of this sort are directed at emails. While some traditional systems for identifying suspicious calls exist, these systems often rely on vigilant recipients to manually report the attempted scam call. Most recipients of a suspicious call may not follow through with a manual reporting process, leaving the system with little data to use to combat future suspicious calls. Some traditional systems rely on identifying features such as the caller's number, which can be easily changed with a variety of caller identification spoofing applications. The instant disclosure, therefore, identifies and addresses a need for systems and methods for detecting suspicious voice calls.

SUMMARY

As will be described in greater detail below, the instant disclosure describes various systems and methods for detecting suspicious voice calls.

In one example, a computer-implemented method for detecting suspicious voice calls may include (i) identifying, by the computing device, an incoming voice call, (ii) extracting, by the computing device, from audio of the incoming voice call, a group of characteristics of the audio of the incoming voice call, (iii) calculating a trustworthiness score of the characteristics based on a response to the incoming voice call, within the incoming voice call, by a recipient of the incoming voice call, and (iv) storing the trustworthiness score of the characteristics in a reputation database that (a) receives a request for the trustworthiness score, the request originating from an additional computing device and including an additional plurality of characteristics extracted from audio of an additional incoming voice call to the additional computing device, (b) determines that the additional plurality of characteristics matches the characteristics, and (c) in response to determining that the additional plurality of characteristics matches the characteristics, enables the additional computing device to perform a security action on the additional incoming voice call by sending the trustworthiness score for the characteristics to the additional computing device.

In some examples, the response by the recipient of the incoming voice call may include a negative response and calculating the trustworthiness score of the characteristics may include reducing a trustworthiness score of the characteristics based on the negative response. In other examples, the response by the recipient of the incoming voice call may include a positive response and calculating the trustworthiness score of the characteristics may include increasing a trustworthiness score of the characteristics based on the positive response.

In one example, the response from the recipient of the incoming voice call may include the recipient of the incoming voice call terminating the incoming voice call within a predetermined time period of the start of the incoming voice call. In one example, the response from the recipient of the incoming voice call may include a tone of voice of the recipient of the incoming voice call. In Additionally or alternatively, the response from the recipient of the incoming voice call may include at least one keyword used by the recipient of the incoming voice call. In one embodiment, extracting, by the computing device the characteristics of the audio of the incoming voice call may include extracting at least one non-audio characteristic of the incoming call.

In some examples, calculating the trustworthiness score of the characteristics may include calculating an individual trustworthiness score for each characteristic in the characteristics. In one embodiment, calculating the trustworthiness score of the characteristics includes calculating a cluster trustworthiness score for the characteristics as a cluster. Additionally or alternatively, calculating the trustworthiness score of the characteristics includes using a machine learning algorithm to calculate the trustworthiness score for the characteristics.

In one example, a computer-implemented method for detecting suspicious voice calls may include (i) identifying, by the computing device, an incoming voice call, (ii) extracting, by the computing device, from audio of the incoming voice call, a group of characteristics of the audio of the incoming voice call, (iii) retrieving, from a reputation database, a trustworthiness score of the characteristics, (iv) determining, based at least in part on the trustworthiness score of the characteristics, that the incoming voice call is suspicious, and (v) performing, by the computing device, a security action on the incoming voice call in response to determining that the incoming voice call is suspicious.

In some examples, performing the security action may include terminating the incoming voice call. Additionally or alternatively, performing the security action may include warning a recipient of the incoming voice call that the incoming voice call is suspicious. In one embodiment, determining, based at least in part on the trustworthiness score of the characteristics, that the incoming voice call is suspicious may include calculating a total trustworthiness score by summing an individual trustworthiness score of each characteristic in the characteristics and determining that the total trustworthiness score falls below a predetermined threshold for trustworthiness.

In one embodiment, a system for implementing the above-described method may include (i) an identification module, stored in memory, that identifies, by the computing device, an incoming voice call, (ii) an extraction module, stored in memory, that extracts, by the computing device, from audio of the incoming voice call, a group of characteristics of the audio of the incoming voice call, (iii) a calculation module, stored in memory, that calculates a trustworthiness score of the characteristics based on a response to the incoming voice call, within the incoming voice call, by a recipient of the incoming voice call, (iv) a storing module, stored in memory, that stores the trustworthiness score of the characteristics in a reputation database that (a) receives a request for the trustworthiness score, the request originating from an additional computing device and include an additional plurality of characteristics extracted from audio of an additional incoming voice call to the additional computing device, (b) determines that the additional plurality of characteristics matches the characteristics, and (c) in response to determining that the additional plurality of characteristics matches the characteristics, enables the additional computing device to perform a security action on the additional incoming voice call by sending the trustworthiness score for the characteristics to the additional computing device, and (v) at least one physical processor that executes the identification module, the extraction module, the calculation module, and the storing module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
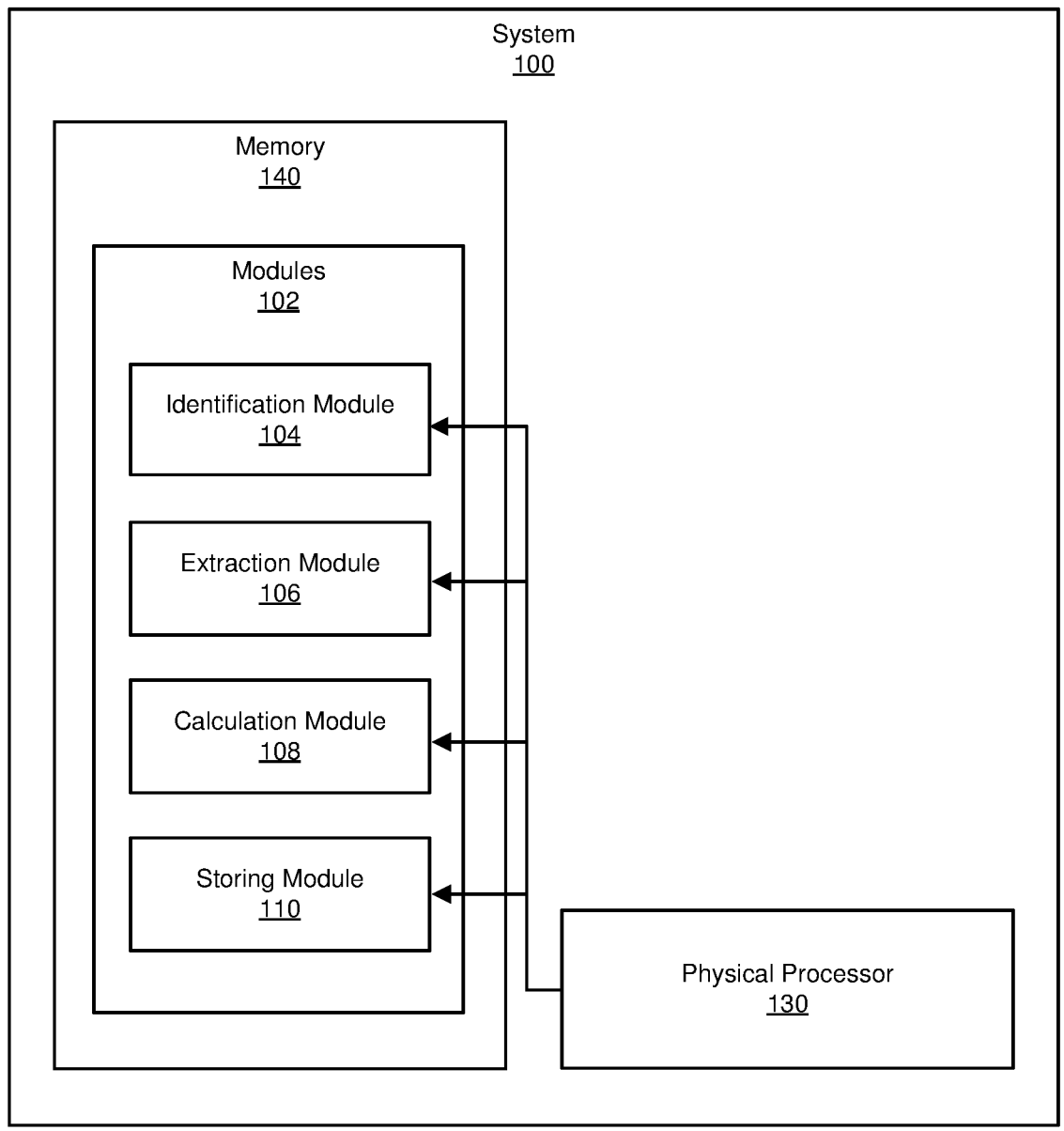
FIG. 1 is a block diagram of an example system for detecting suspicious voice calls.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting suspicious voice calls. As will be explained in greater detail below, by determining a trustworthiness score of various characteristics of a voice call based on the recipient's response within the voice call, the systems and methods described herein may identify characteristics of suspicious voice calls without requiring recipients to manually report suspicious calls. By making determinations about the suspiciousness of calls based on multiple characteristics, the systems and methods described herein may accurately identify suspicious and benign calls even when the details of the call change between iterations. In addition, the systems and methods described herein may improve the functioning of a computing device by detecting potentially malicious calls with increased accuracy and thus reducing the computing device's user's likelihood of victimization by malicious callers.

Figure 2:
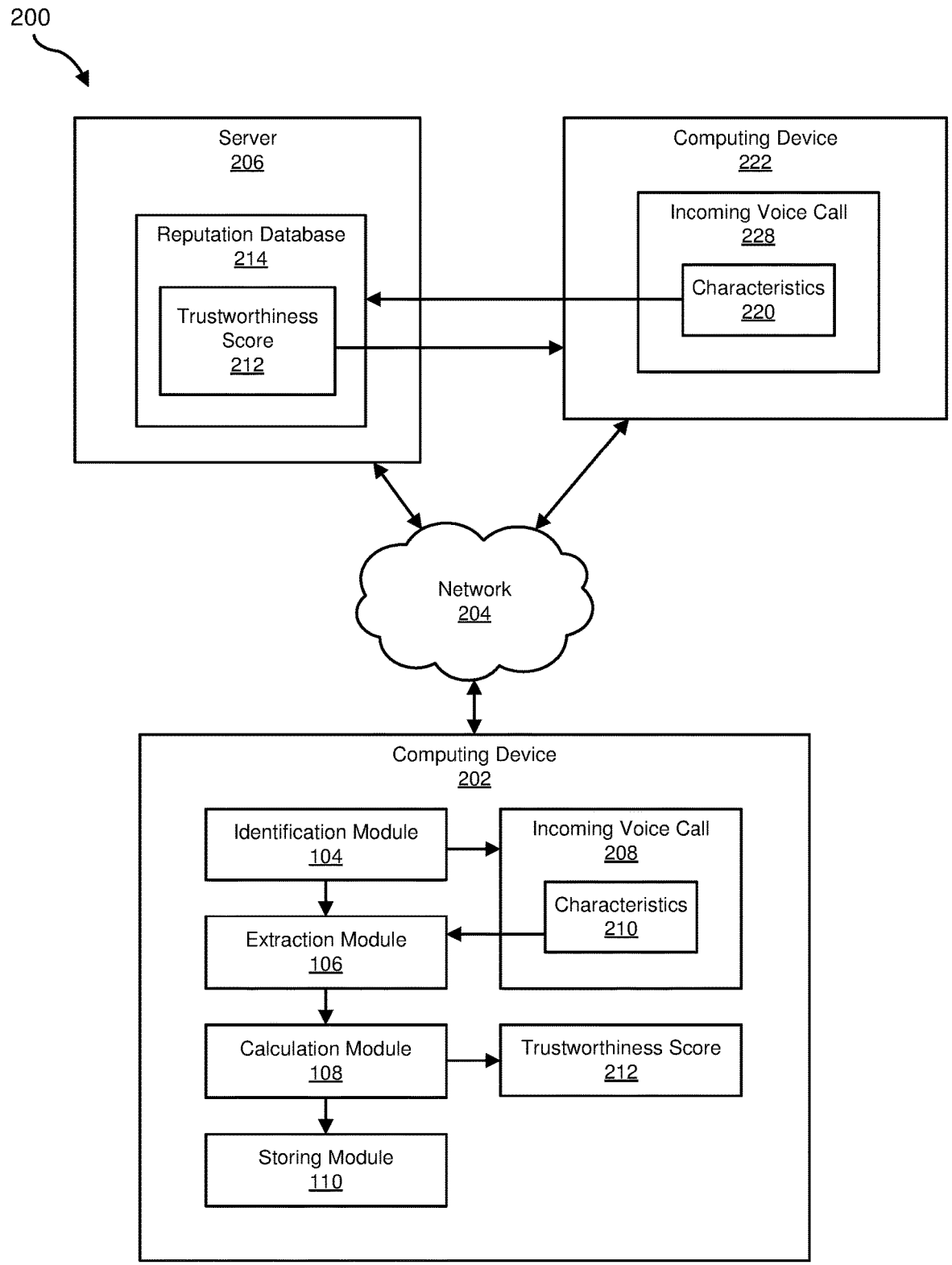
FIG. 2 is a block diagram of an additional example system for detecting suspicious voice calls.
Figure 6:
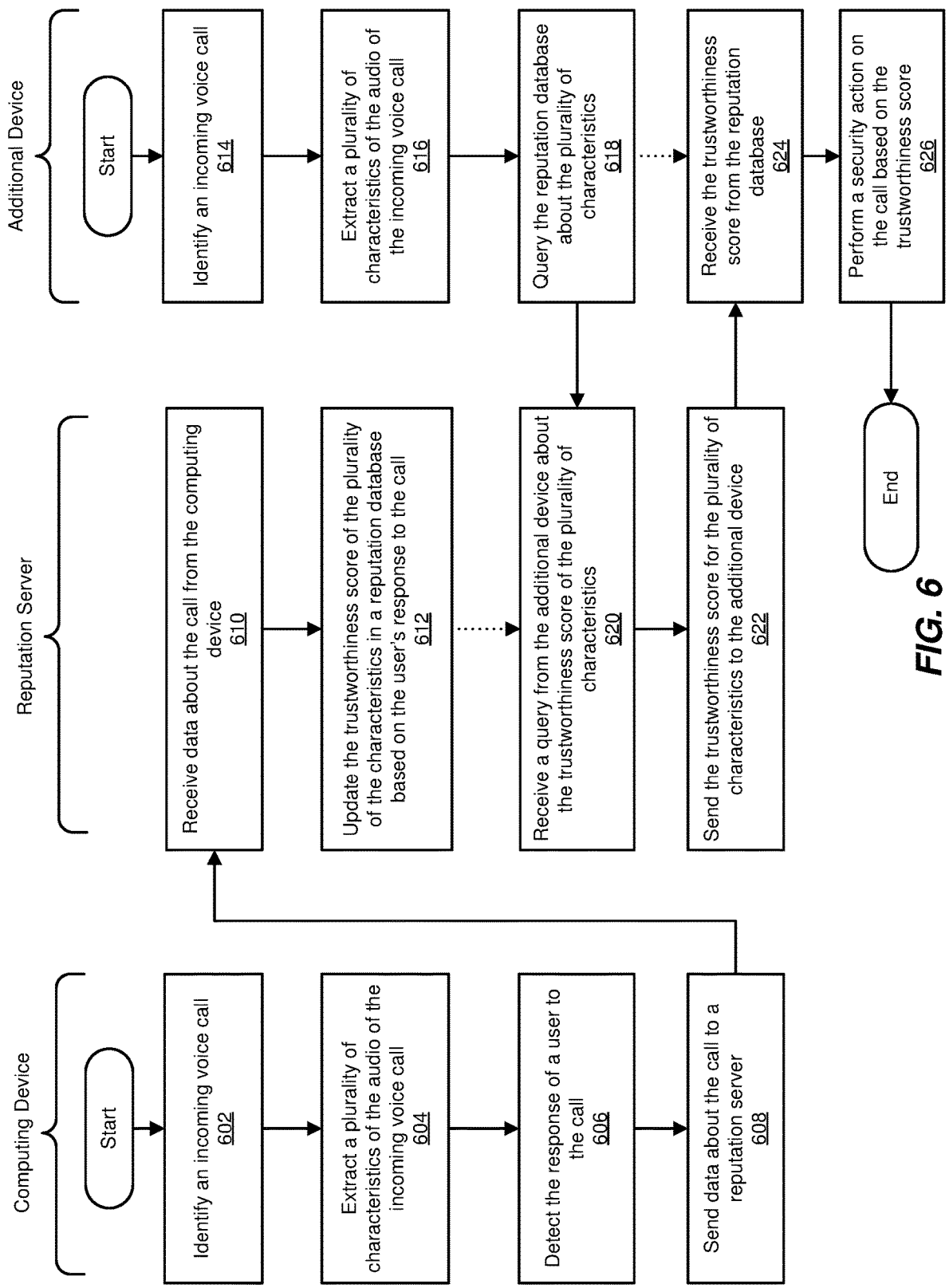
FIG. 6 is a flow diagram of an example method for detecting suspicious voice calls.
Figure 7:
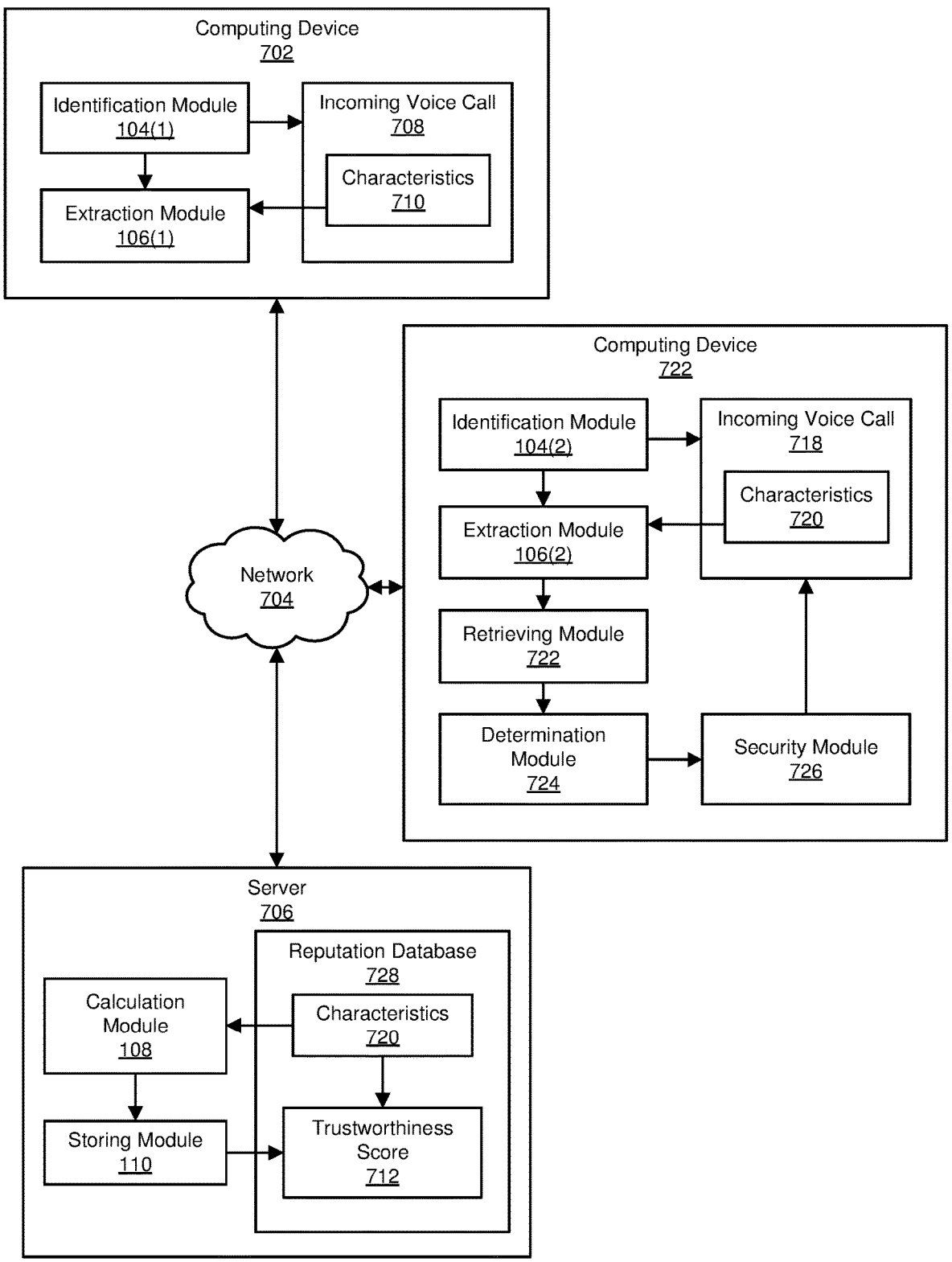
FIG. 7 is a block diagram of an example computing system for detecting suspicious voice calls.

The following will provide, with reference to FIGS. 1, 2 and 7, detailed descriptions of example systems for detecting suspicious voice calls. Detailed descriptions of corresponding computer-implemented methods will also be provided in connection with FIGS. 3, 5, and 6. Detailed descriptions of example characteristics will be provided in connection with FIG. 4. In addition, detailed descriptions of an example computing system and network architecture capable of implementing one or more of the embodiments described herein will be provided in connection with FIGS. 8 and 9, respectively.

FIG. 1 is a block diagram of example system 100 for detecting suspicious voice calls. As illustrated in this figure, example system 100 may include one or more modules 102 for performing one or more tasks. For example, and as will be explained in greater detail below, example system 100 may include an identification module 104 that identifies, by the computing device, an incoming voice call. Example system 100 may additionally include an extraction module 106 that extracts, by the computing device, from audio of the incoming voice call, a plurality of characteristics of the audio of the incoming voice call. Example system 100 may also include a calculation module 108 that calculates a trustworthiness score of the plurality of the characteristics based on a response to the incoming voice call, within the incoming voice call, by a recipient of the incoming voice call. Example system 100 may additionally include a storing module 110 that stores the trustworthiness score of the plurality of characteristics in a reputation database that (a) receives a request for the trustworthiness score, the request originating from an additional computing device and include an additional plurality of characteristics extracted from audio of an additional incoming voice call to the additional computing device, (b) determines that the additional plurality of characteristics matches the plurality of characteristics, and (c) in response to determining that the additional plurality of characteristics matches the plurality of characteristics, enables the additional computing device to perform a security action on the additional incoming voice call by sending the trustworthiness score for the plurality of characteristics to the additional computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 222, and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140.

Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting suspicious voice calls. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 and/or a computing device 222 via a network 204. In one example, all or a portion of the functionality of modules 102 may be performed by computing device 202, server 206, computing device 222, and/or any other suitable computing system. As will be described in greater detail below, one or more of modules 102 from FIG. 1 may, when executed by at least one processor of computing device 202, computing device 222, and/or server 206, enable computing device 202, computing device 222, and/or server 206 to detect suspicious voice calls.

For example, and as will be described in greater detail below, identification module 104 may identify, by computing device 202, an incoming voice call 208. During incoming voice call 208, extraction module 106 may extract, by computing device 202, from audio of incoming voice call 208, a group of characteristics 210 of the audio of incoming voice call 208. During and/or after incoming voice call 208, calculation module 108 may calculate a trustworthiness score 212 of characteristics 210 based on a response to incoming voice call 208, within incoming voice call 208, by a recipient of incoming voice call 208. Next, storing module 110 may store trustworthiness score 212 of characteristics 210 in a reputation database 214 that (a) receives a request for trustworthiness score 212, the request originating from computing device 222 and including a group of characteristics 220 extracted from audio of an incoming voice call 228 to computing device 222, (b) determines that characteristics 220 match characteristics 210, and (c) in response to determining that characteristics 220 match characteristics 210, enables computing device 222 to perform a security action on incoming voice call 228 by sending trustworthiness score 212 to computing device 222.

Computing device 202 and/or computing device 222 generally represent any type or form of computing device capable of reading computer-executable instructions. In some examples, computing device 202 and/or computing device 222 may be mobile phones. In other examples, computing device 202 and/or computing device 222 may be personal computers configured with an application that enables voice calls. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of calculating, storing, and/or providing trustworthiness scores. In one embodiment, server 206 may be a reputation server. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Incoming voice call 208 and/or 228 generally represent any type or form of communication between two or more devices that includes an audio component. Examples of incoming voice call 208 and/or 228 include, without limitation, phone calls and/or audio and/or video calls using a conferencing application. Plurality of characteristics 210 and/or 220 generally represent any trait, characteristic, and/or descriptor of a voice call. Trustworthiness score 212 generally represents any type of score, rating, and/or categorization of one or more characteristics as trustworthy or suspicious.

Figure 3:
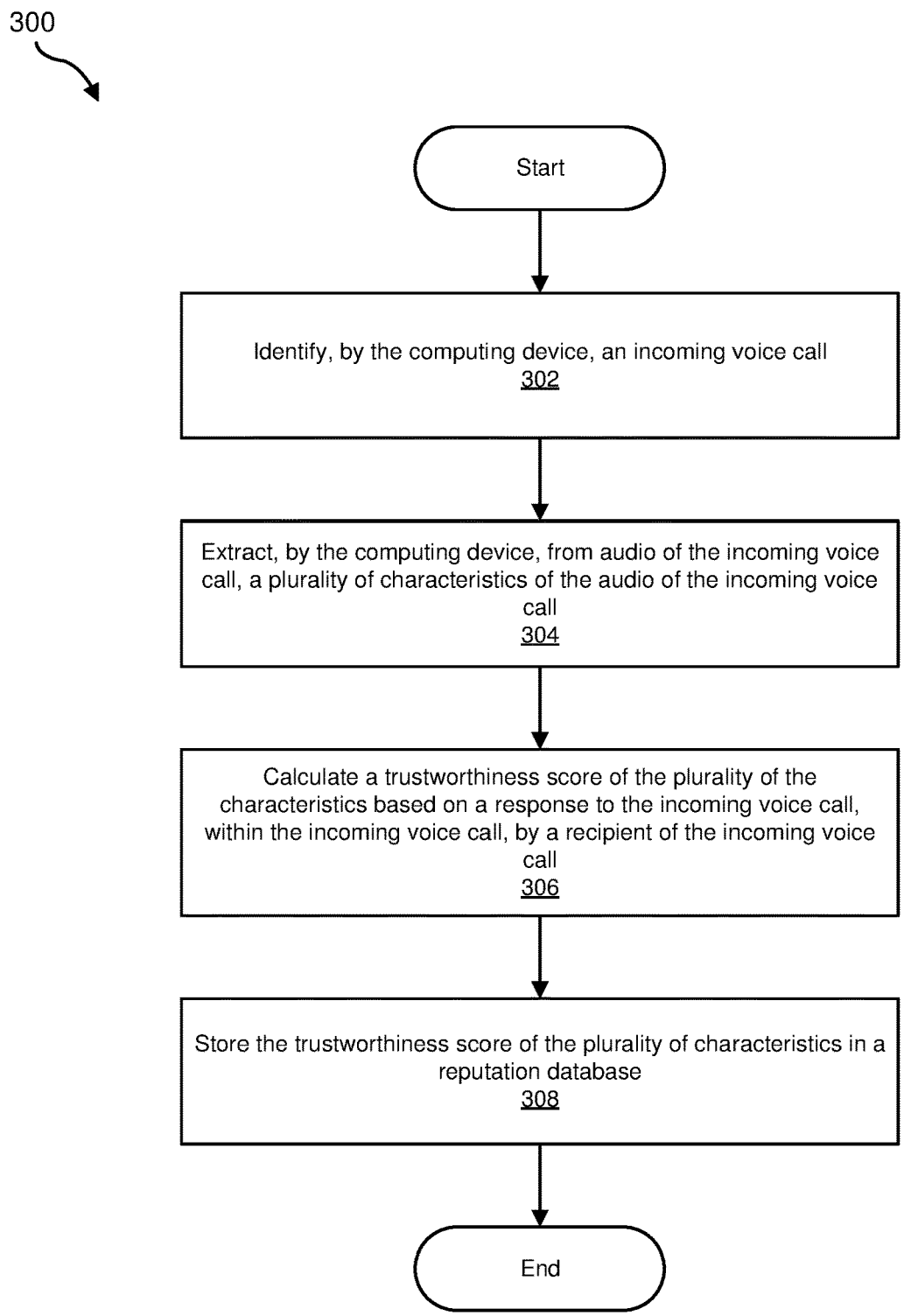
FIG. 3 is a flow diagram of an example method for detecting suspicious voice calls.

FIG. 3 is a flow diagram of an example computer-implemented method 300 for detecting suspicious voice calls. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify, by the computing device, an incoming voice call. For example, identification module 104 may, as part of computing device 202 in FIG. 2, identify, by computing device 202, incoming voice call 208.

The phrase "incoming voice call," as used herein, generally refers to any audio communication initiated via a computing device and directed at one or more receiving computing devices. In some examples, an incoming voice call may be an incoming telephone phone call to a phone. In other examples, an incoming voice call may be an incoming voice and/or video chat, conference, and/or call request to an application that supports audio and/or video calls.

Identification module 104 may identify the incoming voice call in a variety of ways and/or contexts. For example, identification module 104 may be hosted on a phone and may identify an incoming call to the phone. In some embodiments, identification module 104 may be hosted on a network device such as a network bridge, switch, and/or router and may identify an incoming voice call to a computing device that is connected to the network device.

At step 304, one or more of the systems described herein may extract, by the computing device, from audio of the incoming voice call, a plurality of characteristics of the audio of the incoming voice call. For example, extraction module 106 may, as part of computing device 202 in FIG. 2, extract, by computing device 202, from audio of incoming voice call 208, characteristics 210 of the audio of incoming voice call 208.

The term "characteristic," as used herein, generally refers to any aspect of a voice call. In some embodiments, a characteristic may be a characteristic of the audio of a call, some as a tone of voice of the caller, one or more keywords or sets of keywords used by the caller, a turn of phrase used by the caller, a voice profile of the caller, a background noise profile of the caller's location, a period of time between the recipient speaking the caller responding (e.g., a lag that may indicate the caller is a recording), and/or an audio quality of the call. In some examples, a characteristic may not be an audio characteristic. For example, a characteristic may be a geolocation of the caller, an Internet protocol address of the caller, a phone number of the caller, and/or a call service used by the caller.

Extraction module 106 may extract the characteristics of the call in a variety of ways. For example, extraction module 106 may extract the characteristics of the call live, as the call is taking place. In some examples, extraction module 106 may extract the characteristics of the audio of the incoming voice call by extracting at least one non-audio characteristic of the incoming call.

At step 306, one or more of the systems described herein may calculate a trustworthiness score of the plurality of the characteristics based on a response to the incoming voice call, within the incoming voice call, by a recipient of the incoming voice call. For example, calculation module 108 may, as part of computing device 202 in FIG. 2, calculate trustworthiness score 212 of characteristics 210 based on a response to incoming voice call 208, within incoming voice call 208, by a recipient of incoming voice call 208.

The term "trustworthiness score," as used herein, generally refers to any numerical and/or textual description of the trustworthiness and/or probability of trustworthiness of one or more characteristics. In some examples, a trustworthiness score may be a numerical rating of the trustworthiness of a characteristic. Additionally or alternatively, a trustworthiness score may be a category and/or tag such as "known malicious," "suspicious," and/or "known benign."

Calculation module 108 may calculate the trustworthiness score in a variety of ways and/or contexts. In some embodiments, calculation module 108 may be hosted on a personal computing device and/or phone and may calculate the trustworthiness score locally. Additionally or alternatively, calculation module 108 may be hosted on a reputation server and may calculate the trustworthiness score after receiving information about the call from a personal computing device and/or phone that received the call.

In some examples, calculation module 108 may calculate a new trustworthiness score for a characteristic or set of characteristics that have not previously been evaluated. In other examples, calculation module 108 may update an existing trustworthiness score based on information from the incoming voice call.

Calculation module 108 may calculate the trustworthiness score based on a variety of different responses from the recipient. In some examples, the response by the recipient of the incoming voice call may include a negative response and calculation module 108 may calculate the trustworthiness score of the characteristics by reducing an existing trustworthiness score of the characteristics based on the negative response. In one example, the response from the recipient of the incoming voice call may include the recipient of the incoming voice call terminating the incoming voice call within a predetermined time period of the start of the incoming voice call. For example, the recipient may terminate the call within five seconds, ten seconds, or one minute of the start of the call after quickly determining that the call is a scam. In some embodiments, earlier terminations may have higher weights when calculation module 108 calculates the trustworthiness score. In one example, the response from the recipient of the incoming voice call may include a tone of voice of the recipient of the incoming voice call. For example, the recipient may sound angry or annoyed. Additionally or alternatively, the response from the recipient of the incoming voice call may include at least one keyword or phrase used by the recipient of the incoming voice call. For example, the recipient of the call may say, "scam," "no thank you," "remove me from your list," and/or "no further calls."

In some examples, the response by the recipient of the incoming voice call may include a positive response and calculation module 108 may calculate the trustworthiness score of the plurality of characteristics by increasing a trustworthiness score of the plurality of characteristics based on the positive response. For example, the recipient of the call may stay on the phone for a long time, have a cheerful or happy tone of voice, and/or use positive keywords and/or phrases.

In some examples, calculation module 108 may calculate the trustworthiness score of the plurality of characteristics by calculating an individual trustworthiness score for each characteristic in the plurality of characteristics. For example, calculation module 108 may calculate a separate score for the geolocation of the call, the background noise of the call, the tone of voice of the caller of the call, and/or keywords used by the caller.

Figure 4:
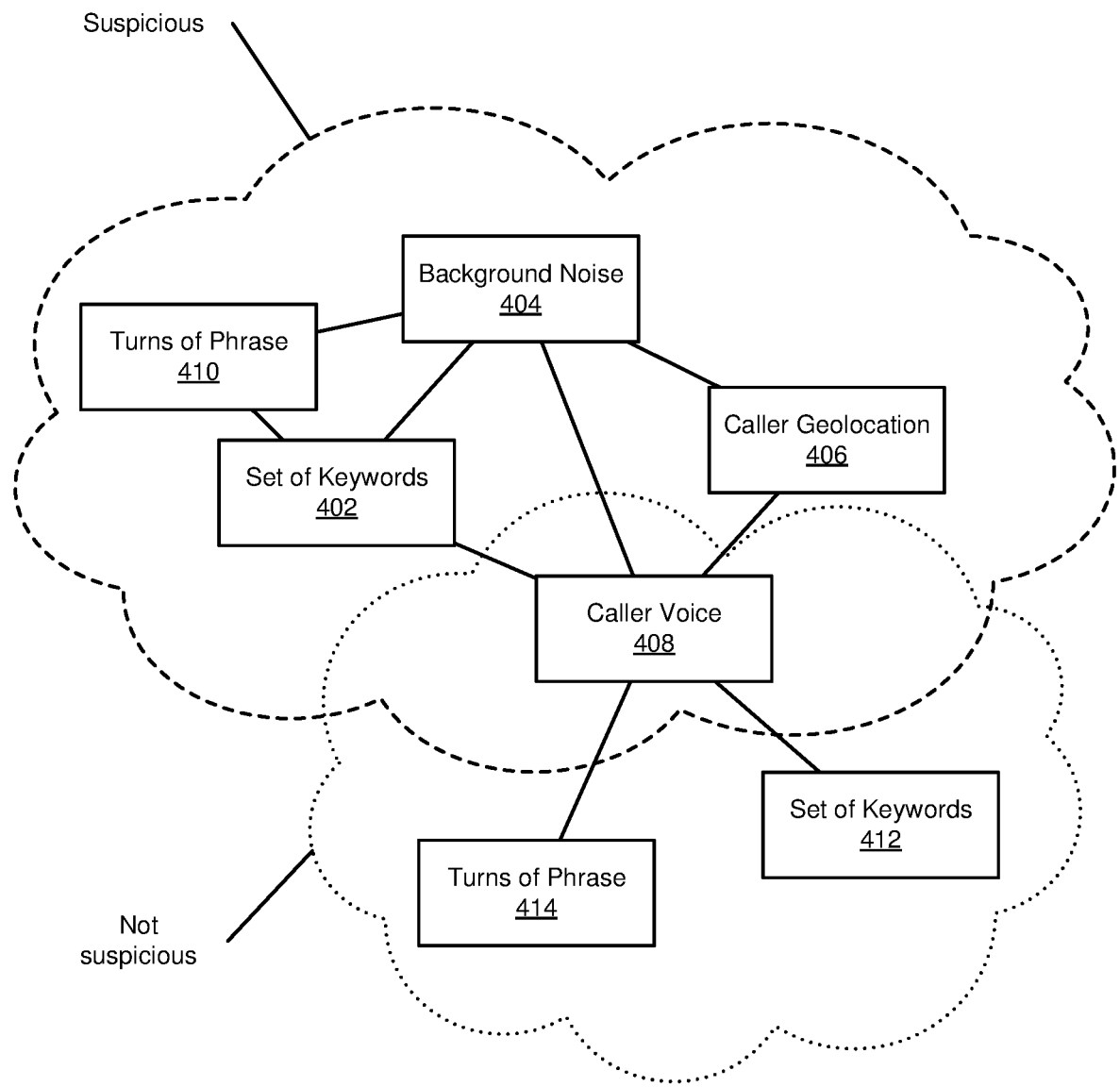
FIG. 4 is a block diagram of example characteristics of a voice call.

In one embodiment, calculation module 108 may calculate the trustworthiness score of the plurality of characteristics by calculating a cluster trustworthiness score for the plurality of characteristics as a cluster. For example, calculation module 108 may calculate that the tone of voice of the caller, combined with the geolocation of the caller, the background noise in the call, and keywords used by the caller all have a trustworthiness score when combined but may not necessarily have the same trustworthiness scores individually or when combined with other characteristics. In one example, as illustrated in FIG. 4, calculation module 108 may determine that set of keywords 402, background noise 404, caller geolocation 406, caller voice 408, and/or turns of phrase 410 may be suspicious when occurring all together but caller voice 408 may not be suspicious when occurring in conjunction with set of keywords 412 and/or turns of phrase 414. For example, someone working at a scam call center may be suspicious when making calls describing exciting new investment opportunities available to a savvy investor, but the same caller may not be suspicious when calling their spouse about what groceries to buy on the way home.

In one embodiment, calculation module 108 may calculate the trustworthiness score of the plurality of characteristics at least in part by using a machine learning algorithm to calculate the trustworthiness score for the plurality of characteristics. In some embodiments, calculation module 108 may use a supervised learning machine learning algorithm that is provided with training samples of suspicious and benign calls. In other embodiments, calculation module 108 may use an unsupervised machine learning algorithm that does not require training samples. In some examples, calculation module 108 may train a machine learning classifier based on a corpus of incoming voice calls collected across various users. For example, calculation module 108 may apply a dimensionality reduction technique that reduces the plurality of characteristics observed within each of the plurality of incoming voice calls to a set of features (e.g., that are fewer in number than the plurality of characteristics and which are determined by the values of the plurality of characteristics). Additionally or alternatively, calculation module 108 may train the machine learning classifier to classify incoming voice calls as trustworthy or untrustworthy (e.g., based on user responses within the respective incoming voice calls).

Returning to FIG. 3, at step 308, one or more of the systems described herein may store the trustworthiness score of the plurality of characteristics in a reputation database that (a) receives a request for the trustworthiness score, the request originating from an additional computing device and include an additional plurality of characteristics extracted from audio of an additional incoming voice call to the additional computing device, (b) determines that the additional plurality of characteristics matches the plurality of characteristics, and (c) in response to determining that the additional plurality of characteristics matches the plurality of characteristics, enables the additional computing device to perform a security action on the additional incoming voice call by sending the trustworthiness score for the plurality of characteristics to the additional computing device. For example, storing module 110 may, as part of computing device 202 in FIG. 2, store trustworthiness score 212 of characteristics 210 in reputation database 214 that (a) receives a request for trustworthiness score 212, the request originating from computing device 222 and including characteristics 220 extracted from audio of an incoming voice call 228 to computing device 222, (b) determines that characteristics 220 match characteristics 210, and (c) in response to determining that characteristics 220 match characteristics 210, enables computing device 222 to perform a security action on incoming voice call 228 by sending trustworthiness score 212 to computing device 222.

The term "reputation database," as used herein, generally refers to any database and/or data structure capable of storing trustworthiness scores for one or more characteristics. In some embodiments, a reputation database may store reputation information on a reputation server. In one embodiment, a reputation database may store and/or analyze connections between calls. For example, a reputation database and/or a reputation system that accesses the reputation database may determine that most callers claiming to represent a certain organization are located in one location but one caller claiming to represent that organization is located in a different location and may therefore be suspicious.

Storing module 110 may store the trustworthiness score to the reputation database in a variety of ways and/or contexts. For example, storing module 110 may store the trustworthiness score by sending the trustworthiness score from a phone and/or personal computing device to a reputation database. In another example, storing module 110 may store a trustworthiness score calculated on a reputation server to a reputation database on the reputation server.

The reputation database may determine that the plurality of characteristics matches the additional plurality of characteristics in a variety of ways. In some examples, the reputation database may determine that the plurality of characteristics matches the additional plurality of characteristics because both contain identical sets of characteristics. In other examples, the reputation database may determine that the pluralities of characteristics match because the plurality of characteristics include a sufficient percentage of overlapping characteristics.

Figure 5:
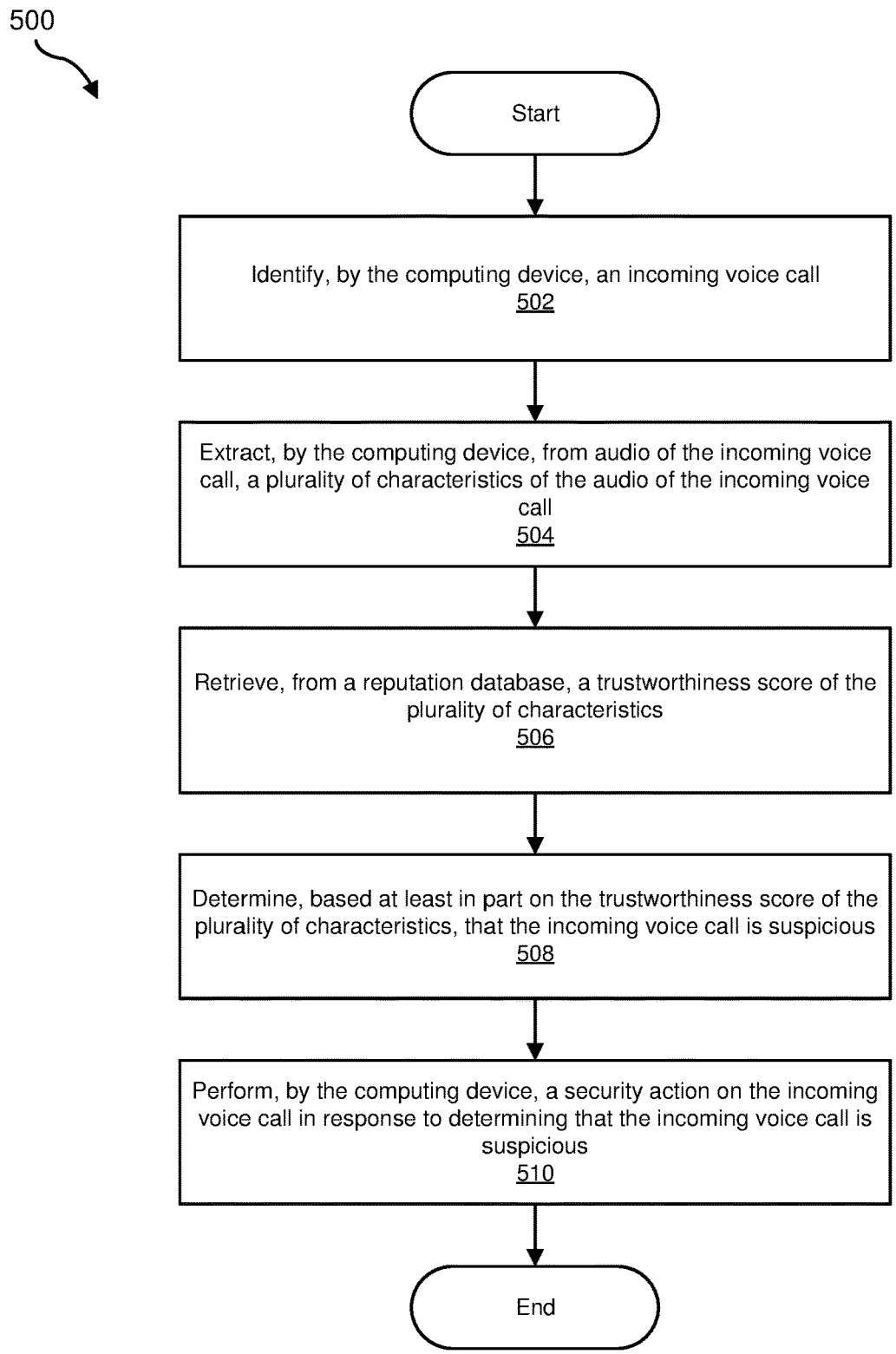
FIG. 5 is a flow diagram of an example method for detecting suspicious voice calls.

In some embodiments, an additional computing device or the same computing device that original received the incoming voice call may use the trustworthiness score to perform a security action on a new call. FIG. 5 is a flow diagram of an example computer-implemented method 500 for detecting suspicious voice calls. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502, one or more of the systems described herein may identify, by the computing device, an incoming voice call. For example, a phone may identify an incoming phone call and/or a personal computer may identify an incoming call via an application.

At step 504, one or more of the systems described herein may extract, by the computing device, from audio of the incoming voice call, a plurality of characteristics of the audio of the incoming voice call. In some embodiments, the systems described herein may begin extracting characteristics as soon as the incoming voice call is identified and/or may continue extracting characteristics for the duration of the call.

At step 506, one or more of the systems described herein may retrieve, from a reputation database, a trustworthiness score of the plurality of characteristics. In some embodiments, the systems described herein may retrieve a trustworthiness score for the characteristics of any incoming voice call to the computing device. In some examples, the systems described herein may retrieve a trustworthiness score at a set point during the incoming voice call, such as after five seconds, ten seconds, or thirty seconds. Additionally or alternatively, the systems described herein may continuously and/or periodically request trustworthiness scores based on the characteristics observed so far during the incoming voice call. For example, a call may exhibit benign characteristics for the first ten seconds and then begin exhibiting suspicious characteristics, and the systems described herein may accurately detect the suspicious call by retrieving multiple trustworthiness scores throughout the call.

At step 508, one or more of the systems described herein may determine, based at least in part on the trustworthiness score of the plurality of characteristics, that the incoming voice call is suspicious.

In one embodiment, determining, based at least in part on the trustworthiness score of the plurality of characteristics, that the incoming voice call is suspicious may include calculating a total trustworthiness score by summing an individual trustworthiness score of each characteristic in the plurality of characteristics and determining that the total trustworthiness score falls below a predetermined threshold for trustworthiness. For example, returning to FIG. 4, set of keywords 402 may have a trustworthiness score of −2, background noise 404 may have a trustworthiness score of −1, caller geolocation 406 may have a trustworthiness score of 0, caller voice 408 may have a trustworthiness score of −1, and/or turns of phrase 410 may have a trustworthiness score of −1. In this example, a call with all of the aforementioned features may have a total trustworthiness score of −5 and may fall below a trustworthiness threshold of 0 and be marked as suspicious. In some examples, set of keywords 412 may have a trustworthiness score of 1 and turns of phrase 414 may have a trustworthiness score of 1, so a call with caller voice 408, set of keywords 412, and turns of phrase 414 may have a total trustworthiness score of 1 which may exceed the trustworthiness threshold of 0 and may therefore be marked as benign. In this example, even though caller voice 408 may be suspicious due to that caller participating in a number of scam calls, a benign call by that caller to a friend or family may not be marked as suspicious because the caller is using different turns of phrase and keywords than are present in the scam script.

Returning to FIG. 5, at step 510, one or more of the systems described herein may perform, by the computing device, a security action on the incoming voice call in response to determining that the incoming voice call is suspicious. In some examples, performing the security action may include terminating the incoming voice call. Additionally or alternatively, performing the security action may include warning a recipient of the incoming voice call that the incoming voice call is suspicious. For example, the systems described herein may give an audio warning to the recipient and/or display a visual dialogue to the recipient.

In some examples, the systems described herein may perform a security action in response to determining that the incoming voice call is benign. For example, the systems described herein may stop collecting data about an incoming voice call after determining that the incoming voice call is benign.

In some embodiments, one or more computing device may communicate with a reputation server to send and/or receive trustworthiness data about incoming voice calls. For example, as illustrated in FIG. 6, at step 602, a computing device may identify an incoming voice call. At step 604, the computing device may extract a plurality of characteristics of the audio of the incoming voice call. In some embodiments, the computing device may also extract one or more non-audio characteristics, such as geolocation. At step 606, the computing device may detect the response of a user of the computing device to the call, such as hanging up, speaking curtly, speaking warmly, and/or using certain keywords. At step 608, the computing device may send data about the call, such as the plurality of characteristics and/or the user response, to a reputation server. In some embodiments, the computing device may send data about the call to the reputation server at multiple times during the call.

At step 610, the reputation server may receive data about the call from the computing device. At step 612, the reputation server may calculate and/or update the trustworthiness score of the characteristics in a reputation database based on the user's response to the call.

At step 614, an additional device may identify an incoming voice call. At step 616, the additional device may extract a plurality of characteristics of the audio of the incoming voice call. At step 618, the additional device may query the reputation database about the plurality of characteristics. In some embodiments, the additional device may query the reputation database at multiple points during the call.

At step 620, the reputation database may receive a query from the additional device about the trustworthiness score of the plurality of the characteristics. At step 622, the reputation database may send the trustworthiness score for the plurality of characteristics to the additional device. In some embodiments, the reputation database may calculate a total trustworthiness score for the plurality of characteristics and send the total trustworthiness score to the additional device. In some embodiments, the reputation database may determine that the trustworthiness score indicates that the incoming voice call is suspicious or benign and may send the classification of the incoming voice call to the additional device.

At step 624, the additional device may receive the trustworthiness score from the reputation database. At step 626, the additional device may perform a security action on the call based on the trustworthiness score. For example, the additional device may warn the user of the additional device that the call is likely a scam and/or may terminate the call.

In some embodiments, the systems described herein may be hosted partly on various personal computing devices and partly on one or more reputation servers. For example, as illustrated in FIG. 7, a computing device 702 may host an identification module 104(1) and an extraction module 106(1) that identify an incoming voice call 708 and extract characteristics 710, respectively. In some examples, computing device 702 may communicate with a server 706 via a network 704. In some embodiments, server 706 may host calculation module 108, storing module 110, and/or a reputation database 728 that stores characteristics 720 and/or a trustworthiness score 712 for characteristics 720.

In some examples, an identification module 104(2) and an extraction module 106(2) on a computing device 722 may identify an incoming voice call 718 and extract characteristics 720, respectively. In some embodiments, a retrieving module 722 may retrieve trustworthiness score 712 of characteristics 720 from reputation database 728 on server 706 and/or a determination module 724 may determine, based on trustworthiness score 712, that incoming voice call 718 is suspicious. In some examples, a security module 726 may then perform a security action in incoming voice call 718.

As explained in connection with FIGS. 3 and 5, the systems and methods described herein may identify fraudulent and/or nuisance phone calls by using data collected by client applications installed within a community of users. The systems and methods described herein may collect data that captures identifying characteristics of the call as well as the user community's response to the call. In some embodiments, the systems and methods described herein may combine data across the community into a call reputation rating and then provide the reputation rating back to users to identify suspicious calls as the calls are received. In some embodiments, users may install the systems described herein as a client application on their device. In various embodiments, this client application may be a mobile application on a phone or a desktop application on a laptop or desktop. In some embodiments, the application may listen in on all audio or video calls made to the user's device. In some examples, the application may listen for the quality of the call, amount of time between answering the call and the caller speaking, time lag between the user speaking and the caller responding, background noise, and the tone, qualities, and emotional content of the caller's voice. In some embodiments, using voice recognition, the application may also monitor the content of the call itself, such as the specific words the caller is using as they initiate the conversation. For example, does the caller say, "Hi John," or does the caller say, "for a small fee?"

In some embodiments, the application may also listen to the user's responses to the call. In one example, the user may great the caller with content and tone that suggests familiarity. In another example, the user might be silent for some time or may sound stressed or clipped. The user might also quickly terminate the call with phrases such as "not interested" or "no thank you." The systems described herein may then upload this data to a backend analytics component of the systems described herein which identify similar calls across the community. For example, the systems and methods described herein may identify calls made by the same caller, with the same background noise, and/or the same greeting or sales pitch. In some embodiments, the systems described herein may also detect suspicious associations across calls, such as a caller with the same voice identification and background noise claiming to be from different organizations, or a caller from China claiming to be from a specific bank when all other callers from that specific bank are located in India or the US. The systems and methods described herein may also analyze how users tended to respond to those calls.

Once enough data has been collected about a particular type of phone call, the systems described herein installed on a user's device may retrieve reputation data about an ongoing call. Periodically throughout a call, the client application may upload metrics about the collected data and retrieve a reputation rating along with an indicator of how certain the reputation system is about that reputation rating. In some embodiments, once the certainty reaches a configured level, the application may interrupt the call with a warning to the user or the application may trust the call and stop collecting data. By compiling reputation data based on users' responses to calls within the calls themselves, the systems and methods described herein may collect a large amount of reliable data without inconveniencing users. By warning users about and/or terminating suspicious calls, the systems and methods described herein may prevent users from being inconvenienced, defrauded, and otherwise victimized by malicious voice calls.

Figure 8:
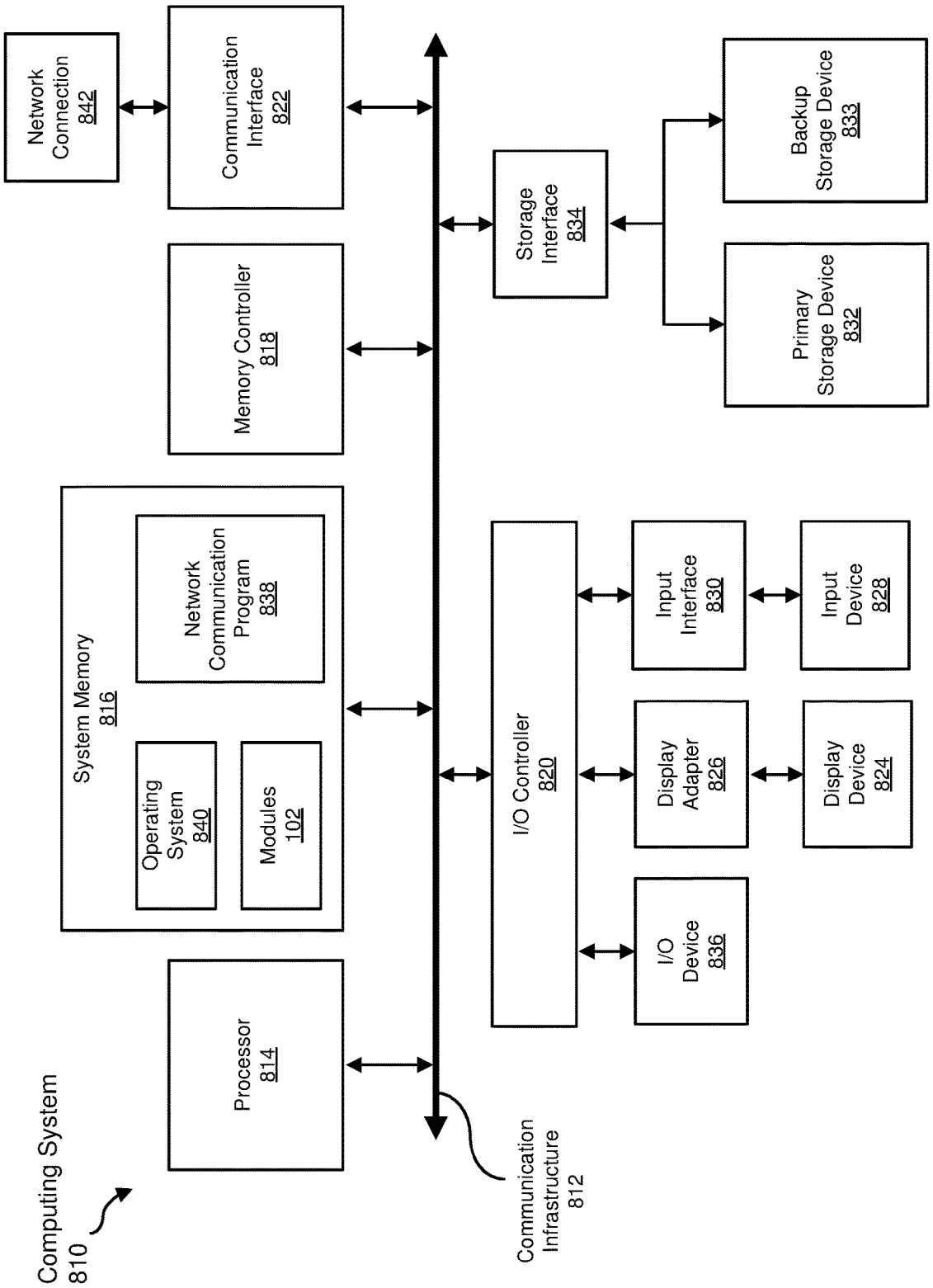
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIGS. 3 and/or 5). All ora portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
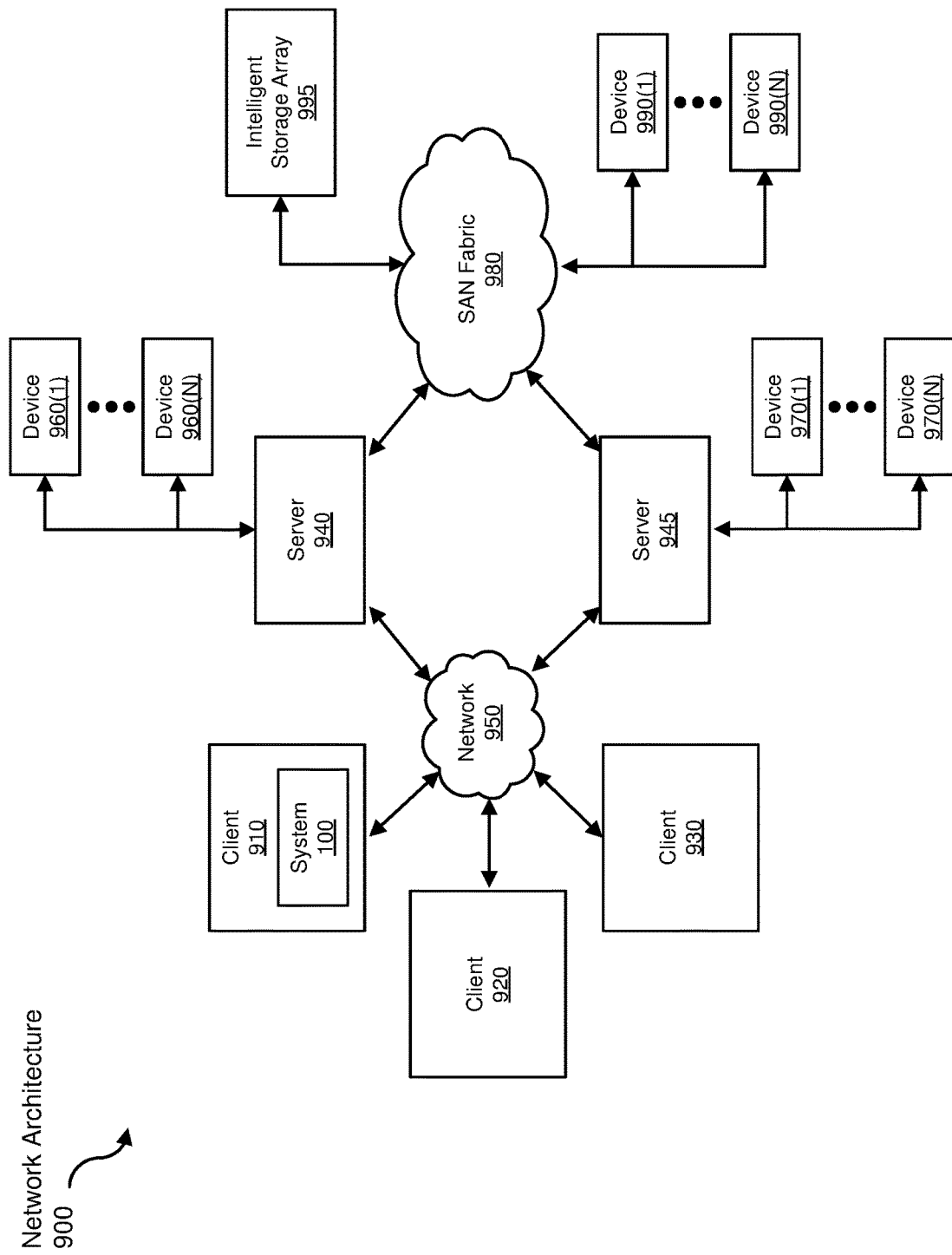
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for detecting suspicious voice calls.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data about characteristics to be transformed, transform the data by calculating a trustworthiness score, output a result of the transformation to a trustworthiness classifier, use the result of the transformation to evaluate voice calls, and store the result of the transformation to a trustworthiness database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting suspicious voice calls, at least a portion of the method being performed by a computing device comprising at least one processor, the method comprising:
   identifying, by the computing device, an incoming voice call;
   extracting, by the computing device and from audio of the incoming voice call, a plurality of characteristics of the audio of the incoming voice call;
   calculating a trustworthiness score of the plurality of the characteristics based at least in part on analyzing a recipient response to the incoming voice call that was made, within the incoming voice call, by a recipient of the incoming voice call and further at least in part on individual trustworthiness scores for each of a geolocation of the call, background noise of the call, a tone of voice of a caller of the call, and keywords used by the caller; and
   providing the plurality of characteristics and the trustworthiness score of the plurality of characteristics to a reputation database that:
      stores the plurality of characteristics and the trustworthiness score of the plurality of characteristics;
      receives a request to evaluate an additional incoming voice call, wherein the request originates from an additional computing device and includes an additional plurality of characteristics extracted from audio of the additional incoming voice call to the additional computing device;
      determines that the additional plurality of characteristics matches the plurality of characteristics; and
      in response to determining that the additional plurality of characteristics matches the plurality of characteristics, enables the additional computing device to perform a security action on the additional incoming voice call by sending the trustworthiness score for the plurality of characteristics to the additional computing device.

2. The computer-implemented method of claim 1, wherein:
   the recipient response by the recipient of the incoming voice call comprises a negative response; and
   calculating the trustworthiness score of the plurality of characteristics comprises reducing a trustworthiness score of the plurality of characteristics based on the negative response.

3. The computer-implemented method of claim 1, wherein:
   the recipient response by the recipient of the incoming voice call comprises a positive response; and
   calculating the trustworthiness score of the plurality of characteristics comprises increasing a trustworthiness score of the plurality of characteristics based on the positive response.

4. The computer-implemented method of claim 1, wherein extracting, by the computing device the plurality of characteristics of the audio of the incoming voice call comprises extracting at least one non-audio characteristic of the incoming call.

5. The computer-implemented method of claim 1, wherein calculating the trustworthiness score of the plurality of characteristics comprises calculating an individual trustworthiness score for each characteristic in the plurality of characteristics.

6. The computer-implemented method of claim 1, calculating the trustworthiness score of the plurality of characteristics comprises calculating a cluster trustworthiness score for the plurality of characteristics as a cluster.

7. The computer-implemented method of claim 1, calculating the trustworthiness score of the plurality of characteristics comprises using a machine learning algorithm to calculate the trustworthiness score for the plurality of characteristics.

8. The computer-implemented method of claim 1, wherein the recipient response from the recipient of the incoming voice call comprises the recipient of the incoming voice call terminating the incoming voice call within a predetermined time period of the start of the incoming voice call.

9. The computer-implemented method of claim 1, wherein the recipient response from the recipient of the incoming voice call comprises a tone of voice of the recipient of the incoming voice call.

10. The computer-implemented method of claim 1, wherein the recipient response from the recipient of the incoming voice call comprises at least one keyword used by the recipient of the incoming voice call.

11. A computer-implemented method for detecting suspicious voice calls, at least a portion of the method being performed by a computing device comprising at least one processor, the method comprising:
   identifying, by the computing device, an incoming voice call;
   extracting, by the computing device, from audio of the incoming voice call, a plurality of characteristics of the audio of the incoming voice call;
   retrieving, from a reputation database, a trustworthiness score of the plurality of characteristics, wherein the reputation database:
      identifies audio from a previously received voice call;
      extracts an additional plurality of characteristics from a recording of audio of the previously received voice call
      calculates an additional trustworthiness score of the additional plurality of characteristics based at least in part on analyzing a recipient response to the previously received voice call that was made, within the previously received voice call, by a recipient of the previously received voice call and further at least in part on individual trustworthiness scores for each of a geolocation of the call, background noise of the call, a tone of voice of a caller of the call, and keywords used by the caller; and
   in response to determining that the plurality of characteristics matches the additional plurality of characteristics, fulfilling the request for the trustworthiness score of the plurality of characteristics by sending the additional trustworthiness score to the computing device;

determining, based at least in part on the trustworthiness score of the plurality of characteristics, that the incoming voice call is suspicious; and performing, by the computing device, a security action on the incoming voice call in response to determining that the incoming voice call is suspicious.

12. The computer-implemented method of claim 11, wherein performing the security action comprises terminating the incoming voice call.

13. The computer-implemented method of claim 11, wherein performing the security action comprises warning a recipient of the incoming voice call that the incoming voice call is suspicious.

14. The computer-implemented method of claim 11, wherein determining, based at least in part on the trustworthiness score of the plurality of characteristics, that the incoming voice call is suspicious comprises:

calculating a total trustworthiness score by summing an individual trustworthiness score of each characteristic in the plurality of characteristics; and determining that the total trustworthiness score falls below a predetermined threshold for trustworthiness.

15. A system for detecting suspicious voice calls, the system comprising:

an identification module, stored in memory, that identifies, by a computing device, an incoming voice call;

an extraction module, stored in memory, that extracts, by the computing device and from audio of the incoming voice call, a plurality of characteristics of the audio of the incoming voice call;

a calculation module, stored in memory, that calculates a trustworthiness score of the plurality of the characteristics based at least in part on analyzing a recipient response to the incoming voice call that was made, within the incoming voice call, by a recipient of the incoming voice call and further at least in part on individual trustworthiness scores for each of a geolocation of the call, background noise of the call, a tone of voice of a caller of the call, and keywords used by the caller;

a storing module, stored in memory, that provides the plurality of characteristics and the trustworthiness score of the plurality of characteristics to a reputation database that:

stores the plurality of characteristics and the trustworthiness score of the plurality of characteristics;

receives a request to evaluate an additional incoming voice call, wherein the request originates from an additional computing device and includes an additional plurality of characteristics extracted from audio of the additional incoming voice call to the additional computing device;

determines that the additional plurality of characteristics matches the plurality of characteristics; and in response to determining that the additional plurality of characteristics matches the plurality of characteristics, enables the additional computing device to perform a security action on the additional incoming voice call by sending the trustworthiness score for the plurality of characteristics to the additional computing device; and at least one physical processor that executes the identification module, the extraction module, the calculation module, and the storing module.

16. The system of claim 15:

wherein:

the identification module, identifies, by the computing device, an additional incoming voice call; and the extraction module extracts, by the computing device, from audio of the additional incoming voice call, an additional plurality of characteristics of the audio of the additional incoming voice call;

further comprising:

a retrieving module, stored in memory, that retrieves, from the reputation database, a trustworthiness score of the additional plurality of characteristics;

a determination module, stored in memory, that determines, based at least in part on the trustworthiness score of the additional plurality of characteristics, that the additional incoming voice call is suspicious; and a security module, stored in memory, that performs, by the computing device, a security action on the additional incoming voice call in response to determining that the incoming voice call is suspicious.

17. The system of claim 16, wherein the security module performs the security action by terminating the incoming voice call.

18. The system of claim 15, wherein the calculation module calculates the trustworthiness score of the plurality of characteristics by calculating an individual trustworthiness score for each characteristic in the plurality of characteristics.

19. The system of claim 15, wherein the calculation module calculates the trustworthiness score of the plurality of characteristics by calculating a cluster trustworthiness score for the plurality of characteristics as a cluster.

20. The system of claim 15, wherein the calculation module calculates the trustworthiness score of the plurality of characteristics by using a machine learning algorithm to calculate the trustworthiness score for the plurality of characteristics.

* * * * *